United States Patent
Uhm et al.

(10) Patent No.: US 9,121,612 B2
(45) Date of Patent: Sep. 1, 2015

(54) SYSTEM AND METHOD FOR REDUCING COMBUSTION DYNAMICS IN A COMBUSTOR

(75) Inventors: Jong Ho Uhm, Simpsonville, SC (US); Thomas Edward Johnson, Greer, SC (US); Baifang Zuo, Simpsonville, SC (US); William David York, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 805 days.

(21) Appl. No.: 13/409,309

(22) Filed: Mar. 1, 2012

(65) Prior Publication Data
US 2013/0227953 A1    Sep. 5, 2013

(51) Int. Cl.
*F23R 3/28* (2006.01)
*F23R 3/00* (2006.01)
*F02C 3/30* (2006.01)
*F23R 3/54* (2006.01)
*F23R 3/32* (2006.01)
*F23D 14/62* (2006.01)

(52) U.S. Cl.
CPC . *F23R 3/286* (2013.01); *F02C 3/30* (2013.01); *F23R 3/002* (2013.01); *F23R 3/54* (2013.01); *F23C 2900/07022* (2013.01); *F23D 14/62* (2013.01); *F23R 3/32* (2013.01); *F23R 2900/00013* (2013.01)

(58) Field of Classification Search
CPC ............ F23R 3/283; F23R 3/286; F23R 3/32; F23R 3/46; F23R 3/002; F02C 3/30; F23L 2900/07002; F23L 2009/07008; F23L 2009/07009; F23D 14/02; F23D 14/40; F23D 14/62; F23D 14/64; Y02T 10/121

USPC ............... 60/746, 747, 737, 742, 738, 39.83, 60/39.3, 39.55, 775, 39.58, 740, 804; 239/398; 431/144
See application file for complete search history.

(56) References Cited

U.S. PATENT DOCUMENTS

| | | | |
|---|---|---|---|
| 3,771,500 A | 11/1973 | Shakiba | |
| 4,100,733 A | 7/1978 | Striebel et al. | |
| 4,104,873 A | 8/1978 | Coffinberry | |
| 4,408,461 A * | 10/1983 | Bruhwiler et al. | 60/737 |
| 4,412,414 A | 11/1983 | Novick et al. | |
| 5,104,310 A | 4/1992 | Saltin | |

(Continued)

OTHER PUBLICATIONS

Search Report and Written Opinion from EP Application No. 12197453.9 dated May 2, 2013.

*Primary Examiner* — Phutthiwat Wongwian
*Assistant Examiner* — Alain Chau
(74) *Attorney, Agent, or Firm* — Dority & Manning, PA (57) ABSTRACT

A system for reducing combustion dynamics in a combustor includes an end cap having an upstream surface axially separated from a downstream surface, and tube bundles extend from the upstream surface through the downstream surface. A divider inside a tube bundle defines a diluent passage that extends axially through the downstream surface, and a diluent supply in fluid communication with the divider provides diluent flow to the diluent passage. A method for reducing combustion dynamics in a combustor includes flowing a fuel through tube bundles, flowing a diluent through a diluent passage inside a tube bundle, wherein the diluent passage extends axially through at least a portion of the end cap into a combustion chamber, and forming a diluent barrier in the combustion chamber between the tube bundle and at least one other adjacent tube bundle.

20 Claims, 8 Drawing Sheets

(56) References Cited

U.S. PATENT DOCUMENTS

| | | | |
|---|---|---|---|
| 5,205,120 A | 4/1993 | Obländer et al. | |
| 5,213,494 A | 5/1993 | Jeppesen | |
| 5,341,645 A | 8/1994 | Ansart et al. | |
| 5,439,532 A | 8/1995 | Fraas | |
| 5,592,819 A | 1/1997 | Ansart et al. | |
| 5,707,591 A | 1/1998 | Semedard et al. | |
| 6,098,407 A | 8/2000 | Korzendorfer et al. | |
| 6,123,542 A | 9/2000 | Joshi et al. | |
| 6,394,791 B2 | 5/2002 | Smith et al. | |
| 6,438,961 B2 | 8/2002 | Tuthill et al. | |
| 6,796,790 B2 | 9/2004 | Venizelos et al. | |
| 6,983,600 B1 | 1/2006 | Dinu et al. | |
| 7,003,958 B2 | 2/2006 | Dinu et al. | |
| 7,007,478 B2 | 3/2006 | Dinu | |
| 7,631,499 B2 | 12/2009 | Bland | |
| 7,752,850 B2 | 7/2010 | Laster et al. | |
| 8,511,086 B1 * | 8/2013 | Uhm et al. | 60/737 |
| 2004/0216463 A1 | 11/2004 | Harris | |
| 2007/0003897 A1 * | 1/2007 | Koizumi et al. | 431/354 |
| 2008/0016876 A1 | 1/2008 | Colibaba-Evulet et al. | |
| 2008/0304958 A1 | 12/2008 | Norris et al. | |
| 2009/0297996 A1 | 12/2009 | Vatsky et al. | |
| 2010/0008179 A1 | 1/2010 | Lacy et al. | |
| 2010/0024426 A1 | 2/2010 | Varatharajan et al. | |
| 2010/0031662 A1 * | 2/2010 | Zuo | 60/740 |
| 2010/0060391 A1 | 3/2010 | Ristola et al. | |
| 2010/0084490 A1 | 4/2010 | Zuo et al. | |
| 2010/0089367 A1 | 4/2010 | Johnson et al. | |
| 2010/0095676 A1 | 4/2010 | Uhm et al. | |
| 2010/0101204 A1 * | 4/2010 | Berry et al. | 60/39.53 |
| 2010/0139280 A1 | 6/2010 | Lacy et al. | |
| 2010/0186413 A1 | 7/2010 | Lacy et al. | |
| 2010/0192581 A1 * | 8/2010 | Ziminsky et al. | 60/737 |
| 2010/0218501 A1 | 9/2010 | York et al. | |
| 2010/0236247 A1 | 9/2010 | Davis, Jr. et al. | |
| 2010/0252652 A1 | 10/2010 | Johnson et al. | |
| 2010/0281876 A1 | 11/2010 | Khan et al. | |
| 2010/0287942 A1 | 11/2010 | Zuo et al. | |
| 2011/0016871 A1 | 1/2011 | Kraemer et al. | |
| 2011/0072824 A1 | 3/2011 | Zuo et al. | |
| 2011/0073684 A1 | 3/2011 | Johnson et al. | |
| 2011/0083439 A1 | 4/2011 | Zuo et al. | |
| 2011/0089266 A1 | 4/2011 | Stoia et al. | |
| 2011/0197587 A1 * | 8/2011 | Zuo et al. | 60/740 |
| 2012/0060511 A1 * | 3/2012 | Zuo et al. | 60/806 |
| 2012/0192566 A1 * | 8/2012 | Uhm et al. | 60/740 |
| 2013/0122434 A1 * | 5/2013 | Stoia et al. | 431/12 |
| 2013/0122435 A1 * | 5/2013 | Stoia et al. | 431/12 |
| 2013/0122436 A1 * | 5/2013 | Stoia et al. | 431/12 |
| 2013/0122438 A1 * | 5/2013 | Stoia et al. | 431/144 |

* cited by examiner

SYSTEM AND METHOD FOR REDUCING COMBUSTION DYNAMICS IN A COMBUSTOR

FEDERAL RESEARCH STATEMENT

This invention was made with Government support under Contract No. DE-FC26-05NT42643, awarded by the Department of Energy. The Government has certain rights in the invention.

FIELD OF THE INVENTION

The present invention generally involves a system and method for reducing combustion dynamics in a combustor.

BACKGROUND OF THE INVENTION

Combustors are commonly used in industrial and power generation operations to ignite fuel to produce combustion gases having a high temperature and pressure. For example, gas turbines typically include one or more combustors to generate power or thrust. A typical gas turbine used to generate electrical power includes an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more nozzles into a combustion chamber in each combustor where the compressed working fluid mixes with fuel and ignites to generate combustion gases having a high temperature and pressure. The combustion gases expand in the turbine to produce work. For example, expansion of the combustion gases in the turbine may rotate a shaft connected to a generator to produce electricity.

Various design and operating parameters influence the design and operation of combustors. For example, higher combustion gas temperatures generally improve the thermodynamic efficiency of the combustor. However, higher combustion gas temperatures also promote flashback or flame holding conditions in which the combustion flame migrates towards the fuel being supplied by the nozzles, possibly causing severe damage to the nozzles in a relatively short amount of time. In addition, higher combustion gas temperatures generally increase the disassociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons.

In a particular combustor design, a plurality of premixer tubes may be radially arranged in an end cap to provide fluid communication for the working fluid and fuel through the end cap and into the combustion chamber. Although effective at enabling higher operating temperatures while protecting against flashback or flame holding and controlling undesirable emissions, some fuels and operating conditions produce very high frequencies with high hydrogen fuel composition in the combustor. Increased vibrations in the combustor associated with high frequencies may reduce the useful life of one or more combustor components. Alternately, or in addition, high frequencies of combustion dynamics may produce pressure pulses inside the premixer tubes and/or combustion chamber that affect the stability of the combustion flame, reduce the design margins for flashback or flame holding, and/or increase undesirable emissions. Therefore, a system and method that reduces resonant frequencies in the combustor would be useful to enhancing the thermodynamic efficiency of the combustor, protecting the combustor from catastrophic damage, and/or reducing undesirable emissions over a wide range of combustor operating levels.

BRIEF DESCRIPTION OF THE INVENTION

Aspects and advantages of the invention are set forth below in the following description, or may be obvious from the description, or may be learned through practice of the invention.

One embodiment of the present invention is a system for reducing combustion dynamics in a combustor. The system includes an end cap that extends radially across at least a portion of the combustor, wherein the end cap comprises an upstream surface axially separated from a downstream surface. A plurality of tube bundles extends from the upstream surface through the downstream surface of the end cap, and each tube bundle provides fluid communication through the end cap. A first divider inside a first tube bundle defines a first diluent passage that extends axially through the downstream surface. A diluent supply in fluid communication with the first divider provides diluent flow to the first diluent passage in the first divider.

Another embodiment of the present invention is a system for reducing combustion dynamics in a combustor that includes an end cap that extends radially across at least a portion of the combustor, wherein the end cap comprises an upstream surface axially separated from a downstream surface. A plurality of tube bundles extends from the upstream surface through the downstream surface of the end cap, and each tube bundle provides fluid communication through the end cap. A first diluent passage inside a first tube bundle extends axially through at least a portion of the end cap and through the downstream surface. A diluent supply in fluid communication with the first diluent passage provides diluent flow to the diluent passage.

The present invention may also include a method for reducing combustion dynamics in a combustor. The method includes flowing a fuel through a plurality of tube bundles that extend axially through an end cap that extends radially across at least a portion of the combustor. The method also includes flowing a diluent through a first diluent passage inside a first tube bundle into a combustion chamber downstream from the end cap, wherein the first diluent passage extends axially through at least a portion of the end cap, and forming a diluent barrier in the combustion chamber between the first tube bundle and at least one other adjacent tube bundle.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for reducing combustion dynamics in a combustor. The system and method generally include a plurality of tube bundles radially arranged in an end cap. The tube bundles supply a mixture of fuel and working fluid to a combustion chamber downstream from the end cap. A divider inside one or more tube bundles produces a diluent barrier between at least one pair of adjacent tube bundles to decouple flame interaction between the adjacent tube bundles and thus reduce the combustion dynamics in the combustor. Although exemplary embodiments of the present invention will be described generally in the context of a combustor incorporated into a gas turbine, one of ordinary skill in the art will readily appreciate that embodiments of the present invention may be applied to any combustor and are not limited to a gas turbine combustor unless specifically recited in the claims.

Figure 1:
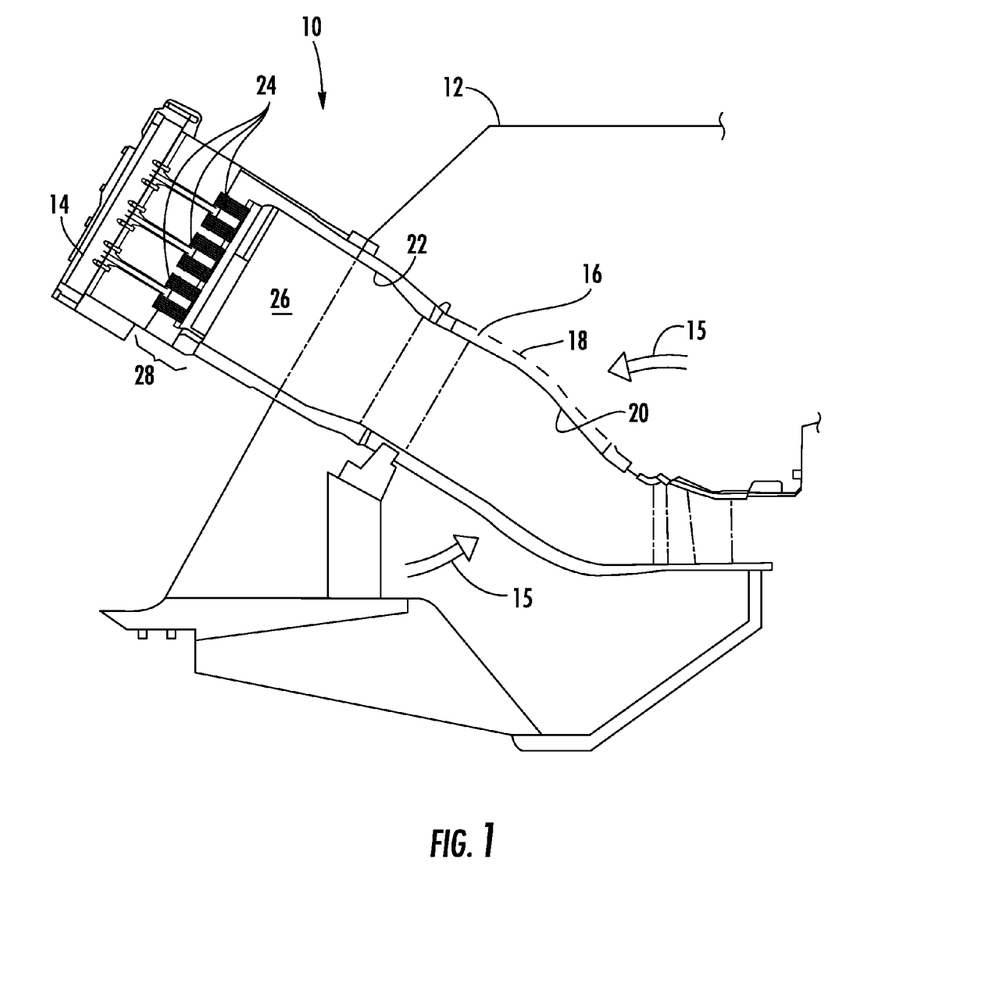
FIG. 1 is a simplified cross-section view of an exemplary combustor according to one embodiment of the present invention.

FIG. 1 shows a simplified cross-section of an exemplary combustor 10, such as would be included in a gas turbine, according to one embodiment of the present invention. A casing 12 and end cover 14 may surround the combustor 10 to contain a working fluid 15 flowing to the combustor 10. The working fluid 15 may pass through flow holes 16 in an impingement sleeve 18 to flow along the outside of a transition piece 20 and liner 22 to provide convective cooling to the transition piece 20 and liner 22. When the working fluid 15 reaches the end cover 14, the working fluid 15 reverses direction to flow through a plurality of tube bundles 24 into a combustion chamber 26.

Figure 2:
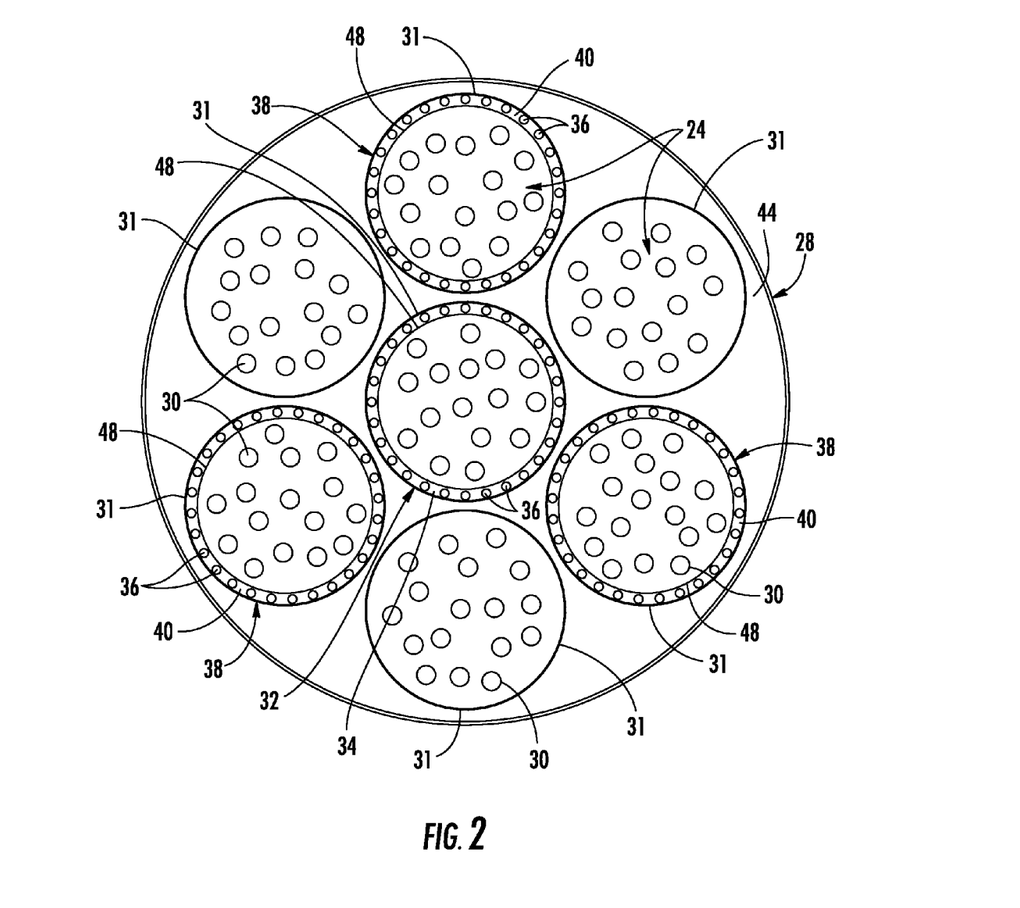
FIG. 2 is an upstream axial view of the end cap shown in FIG. 1 according to a first embodiment of the present invention.
Figure 3:
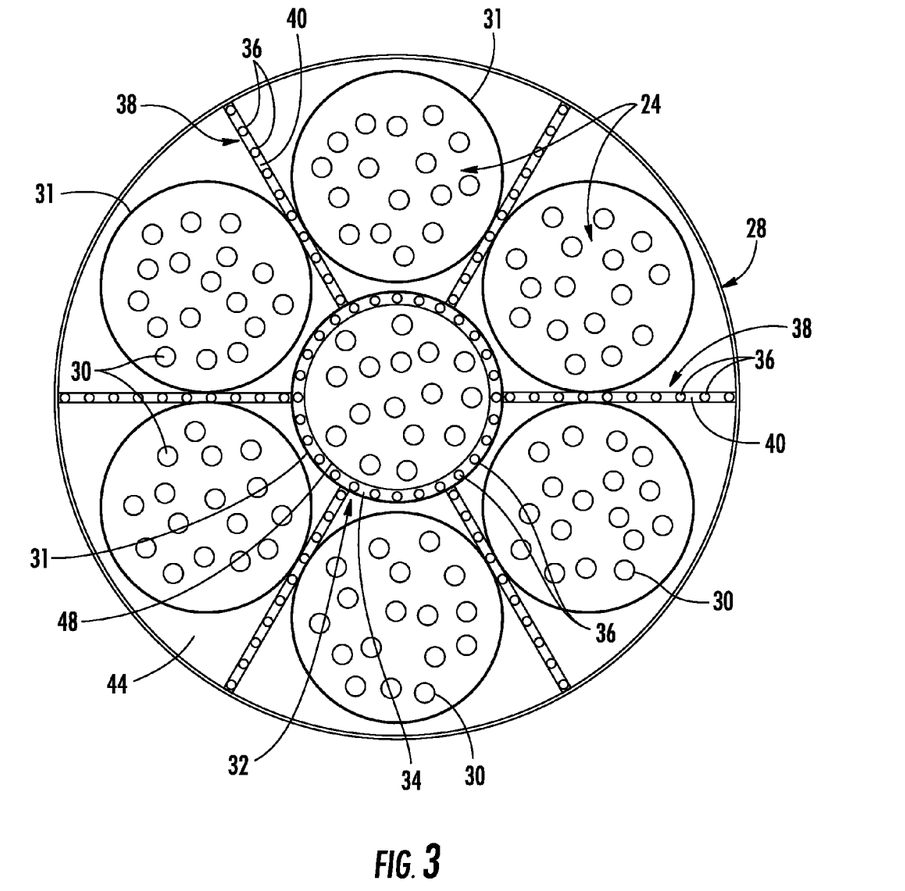
FIG. 3 is an upstream axial view of the end cap shown in FIG. 1 according to a second embodiment of the present invention.
Figure 4:
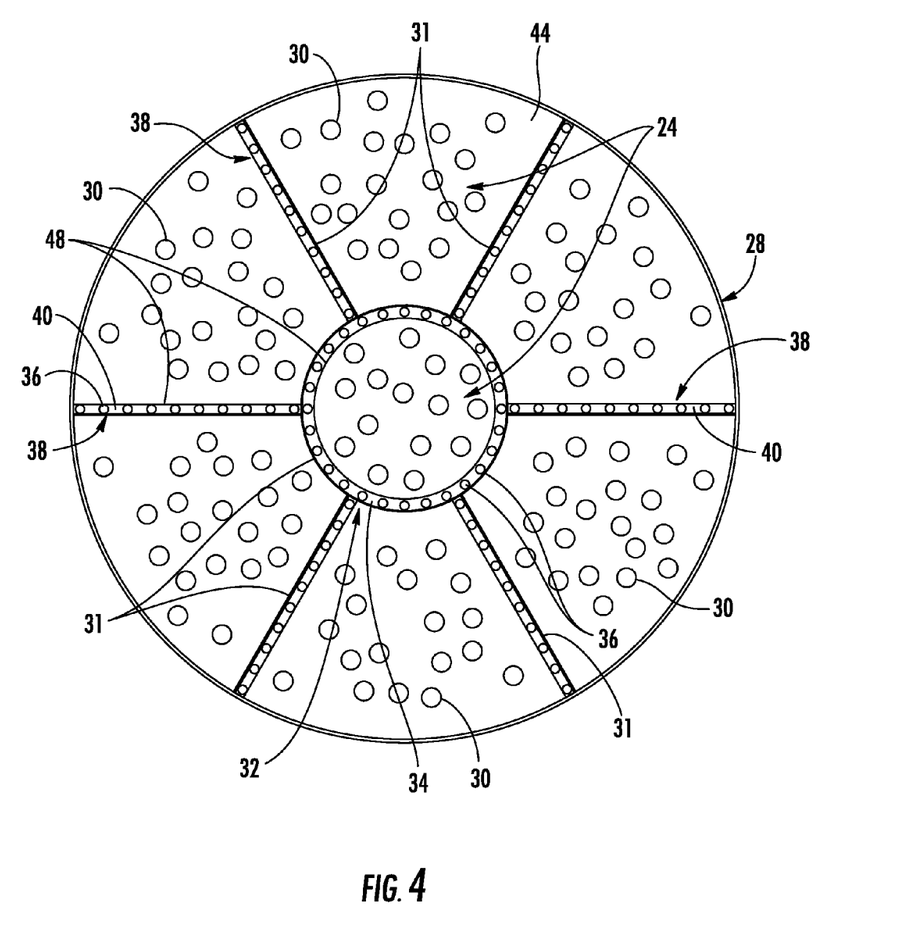
FIG. 4 is an upstream axial view of the end cap shown in FIG. 1 according to a third embodiment of the present invention.
Figure 5:
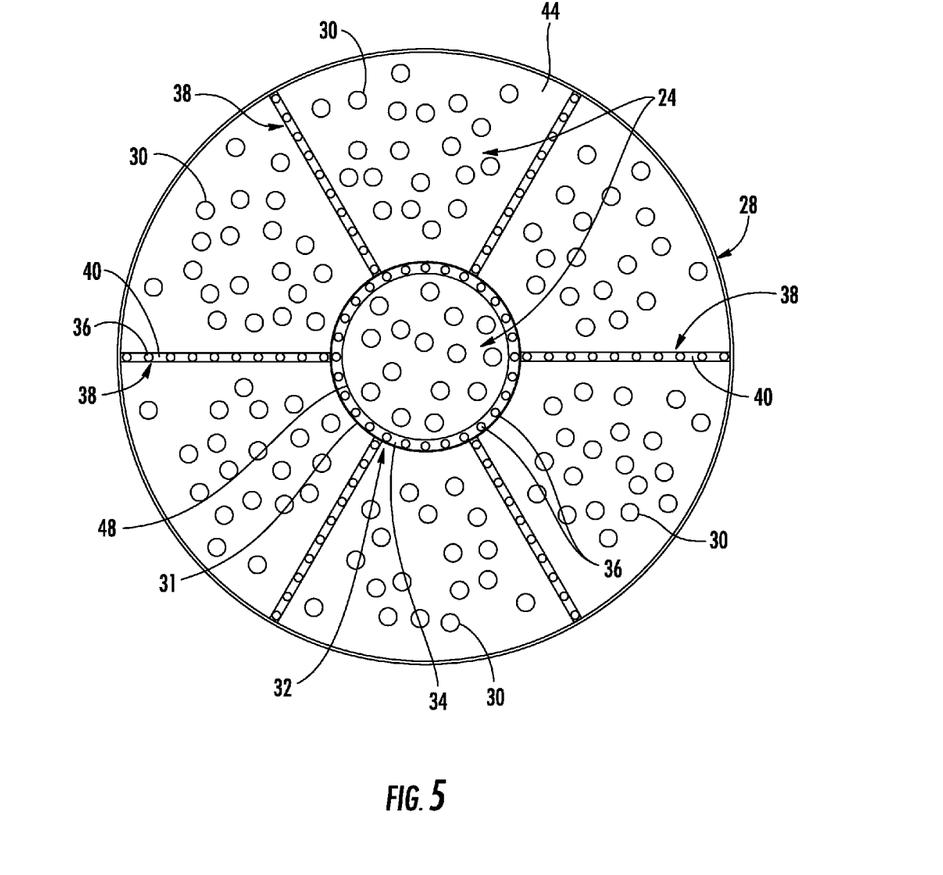
FIG. 5 is an upstream axial view of the end cap shown in FIG. 1 according to a fourth embodiment of the present invention.

The tube bundles 24 are radially arranged in different shapes, numbers, and sizes in an end cap 28 upstream from the combustion chamber 26, and FIGS. 2-5 provide upstream views of exemplary arrangements of the tube bundles 24 in the end cap 28 within the scope of the present invention. As shown in FIGS. 2 and 3, for example, the tube bundles 24 may be radially arranged across the end cap 28 in circular groups of premixer tubes 30 enclosed by outer shrouds 31, with six tube bundles 24 surrounding one tube bundle 24. Alternately, as shown in FIGS. 4 and 5, the tube bundles 24 may be arranged as a circular group of premixer tubes 30 surrounded by the outer shroud 31 surrounded by a series of pie-shaped groups of premixer tubes 30. In FIG. 4, alternating pie-shaped groups of premixer tubes 30 are at least partially enclosed by the outer shroud 31. One of ordinary skill in the art will readily appreciate multiple possible combinations of shapes, numbers, and sizes of the tube bundles 24, and the present invention is not limited to any particular arrangement of tube bundles 24 unless specifically recited in the claims.

In each exemplary arrangement shown in FIGS. 2-5, the flow of fuel and/or working fluid 15 through the premixer tubes 30 and/or tube bundles 24 may produce undesirable combustion dynamics in the combustion chamber 26, particularly when the fuel and/or working fluid 15 flow is approximately equal between each tube bundle 24. As a result, various embodiments of the present invention include one or more features to decouple the combustion flame interaction between the adjacent tube bundles 24 and thus reduce the combustion dynamics in the combustor 10. The features are generally arranged inside and/or between one or more tube bundles 24 and define a structural and/or a fluid barrier between one or more pairs of adjacent tube bundles 24 that separates the adjacent tube bundles 24. In this manner, the structural and/or fluid barrier prevents interaction between the combustion flames produced by the adjacent tube bundles 24 to reduce the undesirable combustion dynamics in the combustion chamber 26.

For example, in the particular tube bundle 24 arrangements shown in FIGS. 2-5, a first divider 32 inside or around the center tube bundle 24 may define a first diluent passage 34 that separates the center tube bundle 24 from the other tube bundles radially arranged in the end cap 28. The first diluent passage 34 generally terminates at one or more diluent ports 36 that provide fluid communication for a diluent to flow through the end cap 28 between the adjacent tube bundles 24. In this manner, the diluent flow through the first divider 32 may sufficiently decouple any combustion flame interaction between the center tube bundle 24 and the other tube bundles 24 radially arranged in the end cap 28. Alternately, or in addition, additional dividers 38 may be arranged inside or between one or more of the tube bundles 24 radially arranged in the end cap 28 to define additional diluent passages 40 and diluent ports 36 between the one or more tube bundles 24 radially arranged in the end cap 28. For example, in the particular embodiments shown in FIGS. 2 and 4, additional dividers 38 inside alternating tube bundles 24 radially arranged in the end cap 28 provide at least one divider 32, 38 and diluent passage 34, 40 between any two adjacent tube bundles 24. Alternately, as shown in the particular embodiments illustrated in FIGS. 3 and 5, the additional dividers 38 may be arranged between one or more of the tube bundles 24 radially arranged in the end cap 28 to again provide at least one divider 32, 38 and diluent passage 34, 40 between any two adjacent tube bundles 24.

Figure 6:
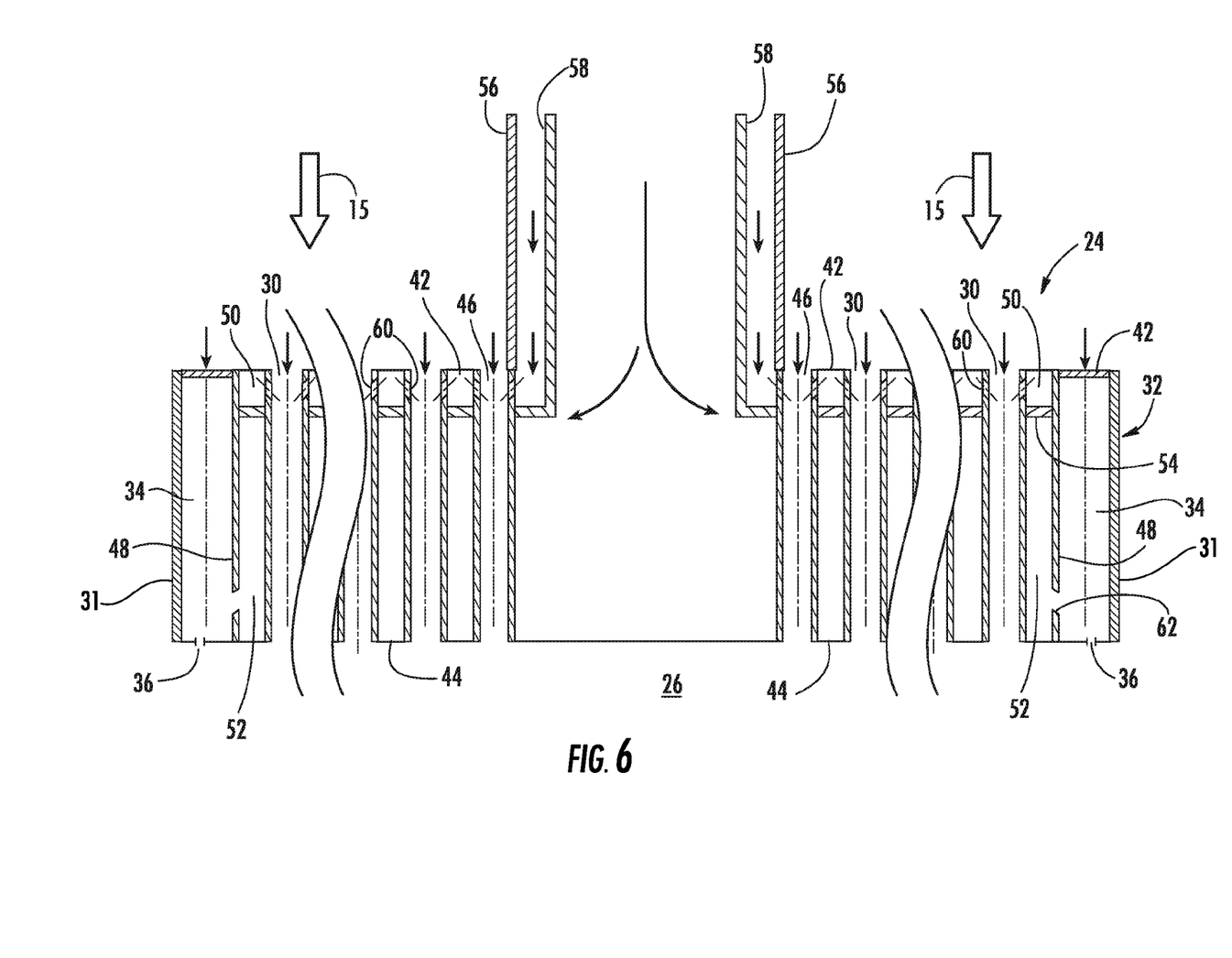
FIG. 6 is an enlarged cross-section view of a tube bundle shown in FIG. 1 according to an embodiment of the present invention.

FIG. 6 provides an enlarged cross-section view of an exemplary tube bundle 24 such as is shown in FIG. 1 and the center of FIGS. 2-5 according to a first embodiment of the present invention. As shown, the tube bundle 24 generally includes an upstream surface 42 axially separated from a downstream surface 44. Each premixer tube 30 includes a tube inlet 46 proximate to the upstream surface 42 and extends through the downstream surface 44 to provide fluid communication for the working fluid 15 to flow through the tube bundle 24 and into the combustion chamber 26. Although shown as cylindrical tubes, the cross-section of the premixer tubes 30 may be any geometric shape, and the present invention is not limited to any particular cross-section unless specifically recited in the claims. An inner shroud 48 circumferentially surrounds at least a portion of the tube bundle 24 to partially define a fuel plenum 50 and a diluent plenum 52 between the upstream and downstream surfaces 42, 44. A generally horizontal barrier 54 may extend radially between the upstream surface 42 and the downstream surface 44 to axially separate the fuel plenum 50 from the diluent plenum 52. In this manner, the upstream surface 42, inner shroud 48, and barrier 54 enclose or define the fuel plenum 50 around the upstream portion of the premixer tubes 30, and the downstream surface 44, inner shroud 48, and barrier 54 enclose or define the diluent plenum 52 around the downstream portion of the premixer tubes 30.

A fuel supply 56 and a diluent supply 58 may extend through the end cover 14 and through the upstream surface 42 to provide fluid communication for fuel and diluent to flow through the end cover 14 to the respective fuel or diluent plenums 50, 52 in each tube bundle 24. The fuel supplied to the tube bundle 24 may include any liquid or gaseous fuel suitable for combustion, and possible diluents supplied to the tube bundle 24 may include water, steam, fuel additives, various inert gases such as nitrogen and/or various non-flammable gases such as carbon dioxide or combustion exhaust gases. In the particular embodiment shown in FIG. 6, the fuel supply 56 is substantially concentric with the diluent supply 58, although such is not a limitation of the present invention unless specifically recited in the claims.

One or more of the premixer tubes 30 may include a fuel port 60 that provides fluid communication from the fuel plenum 50 into the one or more premixer tubes 30. The fuel ports 60 may be angled radially, axially, and/or azimuthally to project and/or impart swirl to the fuel flowing through the fuel ports 60 and into the premixer tubes 30. In this manner, the working fluid 15 may flow through the tube inlets 46 and into the premixer tubes 30, and fuel from the fuel plenum 50 may flow through the fuel ports 60 and into the premixer tubes 30 to mix with the working fluid 15. The fuel-working fluid mixture may then flow through the premixer tubes 30 and into the combustion chamber 26.

The diluent may flow from the diluent supply 58 around the premixer tubes 30 in the diluent plenum 52 to provide convective cooling to the premixer tubes 30 and/or impingement cooling to the downstream surface 44. The diluent may then flow through diluent ports 62 in the divider 32 and into the diluent passage 34. The diluent may then flow through the diluent ports 36 in the diluent passage and into the combustion chamber 26. In this manner, the diluent may form a barrier between adjacent tube bundles 24 to separate the combustion flames of adjacent tube bundles 24, thereby reducing or preventing any interaction between the combustion flames of adjacent tube bundles 24.

Figure 7:
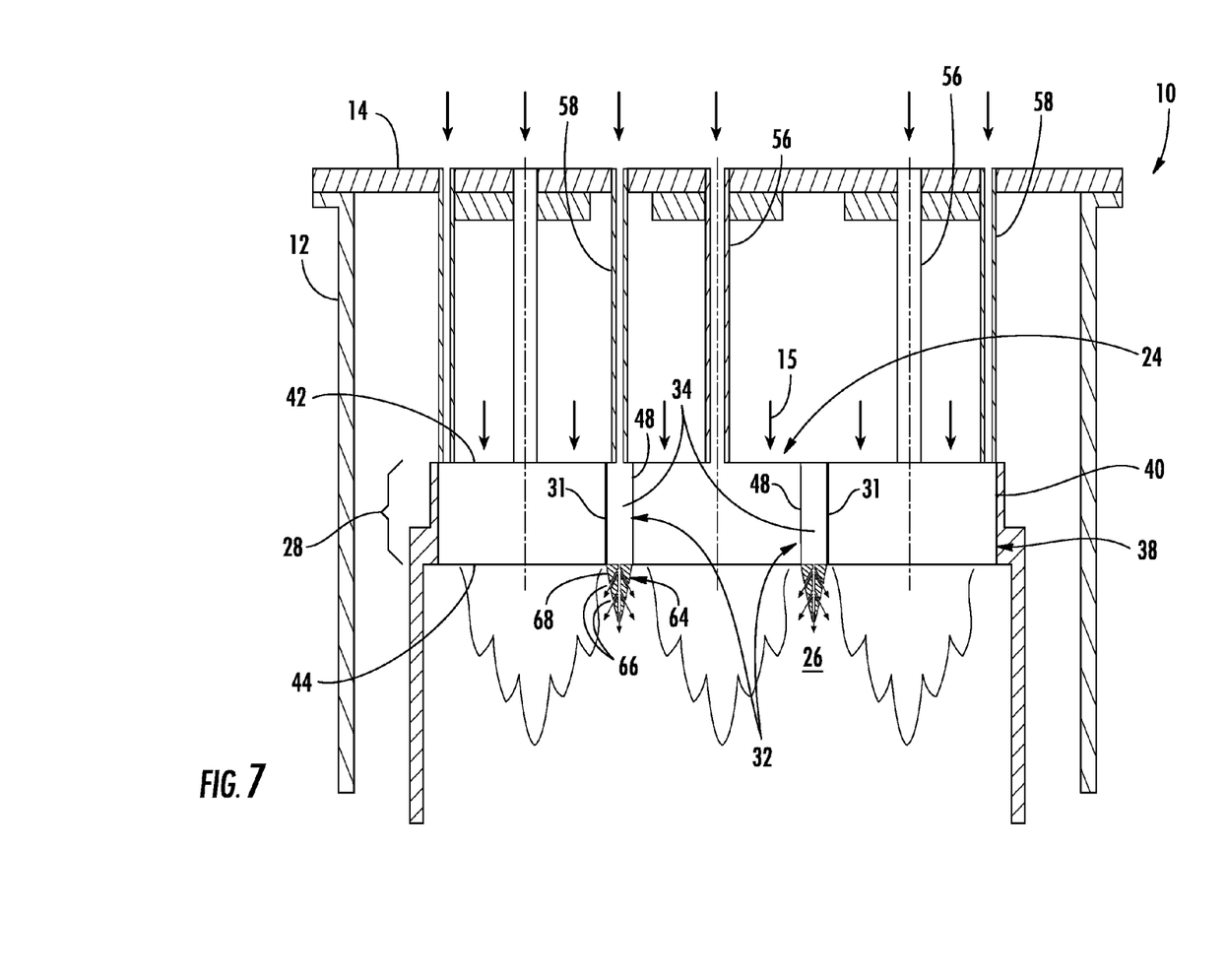
FIG. 7 is an enlarged cross-section view of a portion of the combustor shown in FIGS. 1 and 4 according to an alternate embodiment of the present invention.
Figure 8:
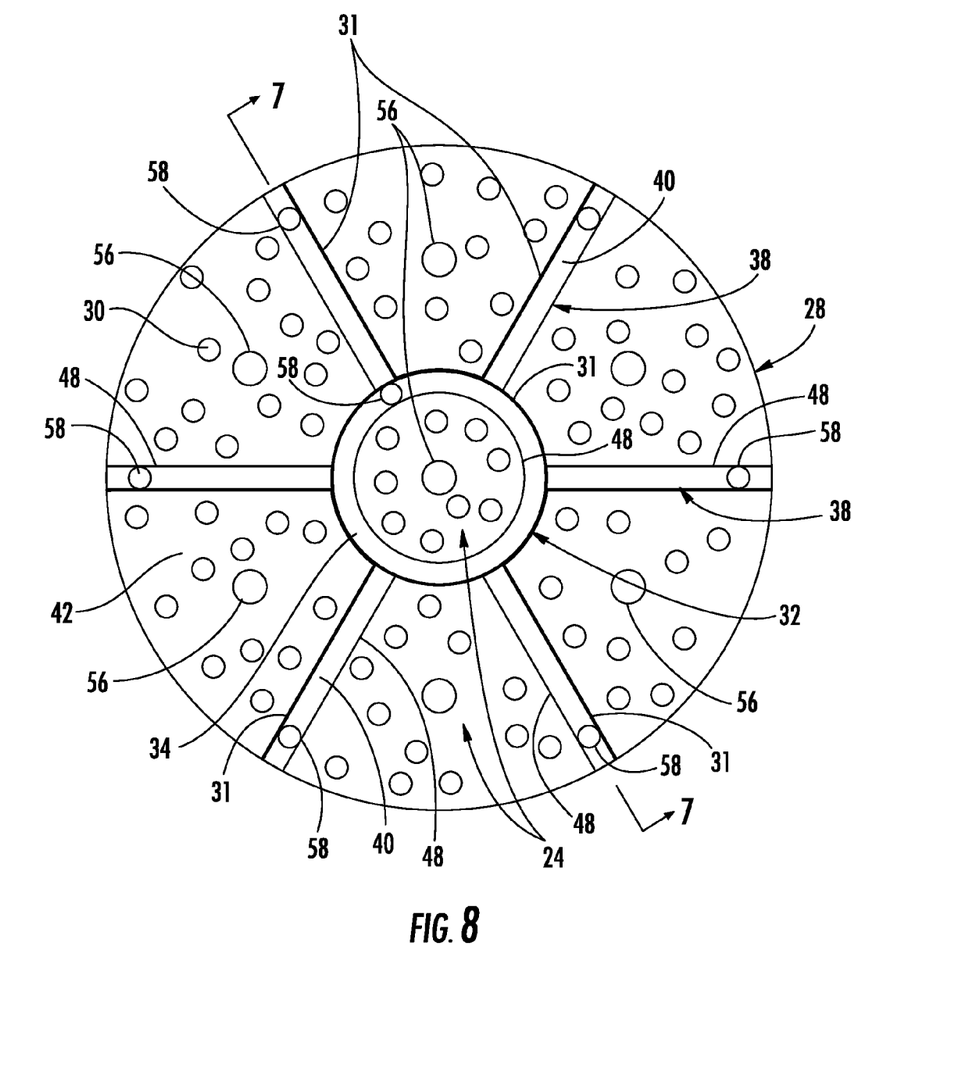
FIG. 8 is a downstream axial view of the end cap shown in FIG. 7.

FIG. 7 provides an enlarged cross-section view of a portion of the combustor 10 shown in FIGS. 1 and 4 according to an alternate embodiment of the present invention, and FIG. 8 provides a downstream axial view of the end cap 28 shown in FIG. 7. As shown, the end cap 28 generally extends radially across at least a portion of the combustor 10 and includes the upstream and downstream surfaces 42, 44 previously described with respect to the tube bundle 24 shown in FIG. 6. As shown in FIG. 7, one or more tube bundles 24 extend from the upstream surface 42 through the downstream surface 44 to provide fluid communication for fuel and/or working fluid 15 through the end cap 28. As additionally shown in FIGS. 7 and 8, the fuel supply 56 is in fluid communication with the tube bundles 24, and the diluent supply 58 is in fluid communication with the diluent passages 34, 40 defined by the dividers 32, 38. The diluent passages 34, 40 extend axially through at least a portion of the end cap 28 and through the downstream surface 44 to separate one or more pairs of adjacent tube bundles 24. In this manner, the diluent supply 58 may supply diluent to and through the diluent passages 34, 40 and into the combustion chamber 26 between the adjacent tube bundles 24.

In the particular embodiment shown in FIG. 7, one or more of the diluent passages 34, 40 terminate at a plurality of diluent distributors 64. The diluent distributors 64 may reside inside the diluent passages 34, 40 or may extend downstream from the downstream surface 44 as shown in FIG. 7. The diluent distributors 64 provide a physical barrier between adjacent tube bundles 24 and may include a plurality of diluent injectors 66 that project the diluent into the combustion chamber 26 between adjacent tube bundles 24. The diluent flowing through the diluent distributors 64 provides convective and/or film cooling to the diluent distributors 64. Alternately or in addition, a thermal barrier coating 68 on the downstream surface of the diluent distributors 64 may protect the diluent distributors 64 from excessive thermal loading and/or oxidation associated with the combustion flame. In particular embodiments, the thermal barrier coating 68 may include a plurality of layers that include at least a metallic bond coating, a thermally prepared oxide, and/or a ceramic top coating, although the particular composition and structure of the thermal barrier coating 68 is not a limitation of the present invention unless specifically recited in the claims.

The various embodiments described and illustrated with respect to FIGS. 1-8 may also provide a method for reducing combustion dynamics in the combustor 10. The method may include flowing the fuel through one or more tube bundles 24 that extend axially through the end cap 28 that extends radially across at least a portion of the combustor 10. The method may further include flowing the diluent through one or more diluent passages 34, 40 inside and/or between one or more tube bundles 24 into the combustion chamber 26 downstream from the end cap 28, wherein the diluent passages 34, 40 separate at least one pair of adjacent tube bundles 24 and extend axially through at least a portion of the end cap 28. In this manner, the method may form a diluent barrier in the combustion chamber 26 between the adjacent tube bundles 24.

In particular embodiments, the method may form the diluent barrier completely around one or more tube bundles 24 and/or between each pair of adjacent tube bundles 24. In still further embodiments, the method may inject the diluent into the combustion chamber 26 downstream from the end cap 28 and/or flow the fuel concentrically with the diluent through at least a portion of the combustor 10.

The systems and methods described herein may provide one or more of the following advantages over existing nozzles and combustors. For example, the diluent barrier created by the dividers 32 and/or diluent passages 34 decouple flame interaction between the adjacent tube bundles 24 and thus reduce the combustion dynamics in the combustor 10. The reduced combustion dynamics in the combustor 10 may extend the operating capability of the combustor 10 over a wide range of fuels without decreasing the useful life and/or maintenance intervals for various combustor 10 components. Alternately, or in addition, the reduced combustion dynamics may maintain or increase the design margin against flashback or flame holding and/or reduce undesirable emissions over a wide range of combustor 10 operating levels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for reducing combustion dynamics in a combustor, comprising:
   a. an end cap that extends radially across at least a portion of the combustor, wherein the end cap comprises an upstream surface axially separated from a downstream surface;
   b. a plurality of tube bundles that extends from the upstream surface through the downstream surface of the end cap, wherein each tube bundle provides fluid communication through the end cap;
   c. a first divider that extends circumferentially around a first tube bundle, wherein the first divider is defined by an inner shroud and an outer shroud that extend axially within the end cap and at least partially through the downstream surface, wherein the first divider defines a first diluent passage that extends axially through the downstream surface, wherein the first diluent passage is defined between the inner shroud and the outer shroud;
   d. a diluent supply in fluid communication with the first divider, wherein the diluent supply provides diluent flow to the first diluent passage in the first divider; and
   e. a second divider that is radially outward of the first divider, wherein the second divider separates the tube bundles into a plurality of sectors, the second divider having a second diluent passage that extends axially through the downstream surface.

2. The system as in claim 1, wherein the second divider is defined by a first shroud and a second shroud that extends axially within the end cap, wherein the second divider extends radially outwardly from the outer shroud of the first divider between a pair of adjacent tube bundles, wherein the second divider defines the second diluent passage between the first shroud and the second shroud.

3. The system as in claim 1, that extends circumferentially around a second tube bundle disposed within the end cap, wherein the second divider is defined by a second inner shroud and a second outer shroud that extend axially within the end cap and at least partially through the downstream surface, wherein the second divider defines the second diluent passage between the second inner shroud and the second outer shroud.

4. The system as in claim 1, wherein the first diluent passage terminates at a plurality of diluent ports that provide fluid communication for the diluent flow through the downstream surface of the end cap.

5. The system as in claim 1, wherein the first diluent passage terminates at a plurality of diluent distributors that extend downstream from the downstream surface.

6. The system as in claim 5, further comprising a thermal barrier coating on the plurality of diluent distributors.

7. The system as in claim 1, further comprising a fuel supply in fluid communication with each tube bundle, wherein the fuel supply is substantially concentric with the diluent supply.

8. A system for reducing combustion dynamics in a combustor, comprising:
   a. an end cap that extends radially across at least a portion of the combustor wherein the end cap comprises an upstream surface axially separated from a downstream surface;
   b. a plurality of tube bundles that extends from the upstream surface through the downstream surface of the end cap, wherein each tube bundle provides fluid communication through the end cap;
   c. a first diluent passage, that extends circumferentially around a first tube bundle, wherein the first diluent passage is defined between an inner shroud and an outer shroud that extends axially within the end cap and at least partially through the downstream surface, wherein the first diluent passage extends axially through the downstream surface;
   d. a diluent supply in fluid communication with the first diluent passage, wherein the diluent supply provides diluent flow to the diluent passage; and
   e. a second diluent passage that is radially outward of the first diluent passage and extends axially through the downstream surface, wherein the second diluent passage separates the tube bundles into a plurality of sectors.

9. The system as in claim 8, wherein the second diluent passage is defined between a first shroud and a second shroud that extends axially within the end cap, wherein the first shroud and the second shroud extend radially outwardly from the outer shroud of the first diluent passage between a pair of adjacent tube bundles.

10. The system as in claim 8, wherein the second diluent passage extends circumferentially around a second tube bundle disposed within the end cap, wherein the second diluent passage is defined between a second inner shroud and a second outer shroud that extend axially within the end cap and at least partially through the downstream surface.

11. The system as in claim 8, wherein the first diluent passage terminates at a plurality of diluent ports that provide fluid communication for the diluent flow through the downstream surface of the end cap.

12. The system as in claim 8, wherein the first diluent passage terminates at a plurality of diluent distributors that extend downstream from the downstream surface.

13. The system as in claim 12, further comprising a thermal barrier coating on the plurality of diluent distributors.

14. The system as in claim 8, further comprising a fuel supply in fluid communication with each tube bundle, wherein the fuel supply is substantially concentric with the diluent supply.

15. The system as in claim 8, wherein the diluent provides at least one of water, steam, a fuel additive, an inert gas, or a non-flammable gas to the diluent passage.

16. A method for reducing combustion dynamics in a combustor, comprising:
   a. flowing a fuel through a plurality of tube bundles that extend axially through an end cap that extends radially across at least a portion of the combustor;
   b. flowing a diluent through a first diluent passage of a first tube bundle into a combustion chamber downstream from the end cap, wherein the first diluent passage extends circumferentially around a first tube bundle, wherein the first diluent passage is defined between an inner shroud and an outer shroud that extend axially within the end cap and at least partially through a downstream surface of the end cap, wherein the first diluent passage extends axially through at least a portion of the end cap;
   c. forming a diluent barrier in the combustion chamber between the first tube bundle and at least one other adjacent tube bundle; and
   d. flowing diluent through a second diluent passage, wherein the second diluent passage is radially outward of the first diluent passage and separates the plurality of tube bundles into a plurality of sectors.

17. The method as in claim 16, further comprising forming the diluent barrier around the first tube bundle.

18. The method as in claim 16, further comprising forming the diluent barrier between each pair of adjacent tube bundles.

19. The method as in claim 16, further comprising injecting the diluent into the combustion chamber downstream from the end cap.

20. The method as in claim 16, further comprising flowing the fuel concentrically with the diluent through at least a portion of the combustor.

* * * * *